United States Patent [19]
Stein et al.

[11] Patent Number: 5,239,387
[45] Date of Patent: Aug. 24, 1993

[54] BUFFERING CONTROL FOR ACCOMMODATING VARIABLE DATA EXCHANGE RATES

[75] Inventors: Irene F. Stein, Fort Collins; Steven L. Webb, Loveland, both of Colo.

[73] Assignee: Hewlett-Packard Company, Palo Alto, Calif.

[21] Appl. No.: 668,807

[22] Filed: Mar. 7, 1991

Related U.S. Application Data

[63] Continuation-in-part of Ser. No. 444,090, Nov. 30, 1989, abandoned.

[51] Int. Cl.⁵ .......................................... H04N 1/387
[52] U.S. Cl. .................................. 358/444; 358/474; 358/486
[58] Field of Search ............... 358/404, 405, 412, 413, 358/431, 437, 444, 474, 486

[56] References Cited

U.S. PATENT DOCUMENTS

| | | |
|---|---|---|
| 4,367,493 | 1/1983 | Matteson . |
| 4,511,928 | 4/1985 | Colomb . |
| 4,586,088 | 4/1986 | Kondo . |
| 4,591,727 | 5/1986 | Gaebelein et al. . |
| 4,743,975 | 5/1988 | Ijuin . |
| 4,748,514 | 5/1988 | Bell . |
| 4,752,891 | 6/1988 | Van Daele et al. . |
| 4,864,416 | 9/1989 | Ishikawa et al. ............ 358/486 |
| 5,047,871 | 9/1991 | Meyer et al. ................ 358/486 |
| 5,130,809 | 7/1992 | Takayanagi ................. 358/444 |

*Primary Examiner*—Edward L. Coles, Sr.
*Assistant Examiner*—Kim Yen Vu

[57] ABSTRACT

Digital data produced by a document scanner or other data source is sequentially stored in a memory. A remote data receiver generates requests for data causing communication of the data from the memory in the same sequence in which it was stored but at a rate substantially asynchronous with respect to the rate of scanner data production. Data is concurrently loaded into the memory and transferred from the memory to the receiver so that continuous data storage and transfer throughout the scan of a given image is possible. Data from the scanner is sequentially loaded into the memory in recycling sequences until there are no available memory storage sections. The scanner is then caused to stop scanning and to cease data production until transfer of data occurs from a memory storage section to the remote receiver. The scanner is thereafter enabled so as to resume with production of the next data following that which was last loaded into the memory. For a scanner, the data interruption and resumption is obtained by stopping and repositioning of the scanner bar relative to the document. Scanning is started or restarted when the data in the memory is inadequate to completely satisfy the current receive command.

11 Claims, 5 Drawing Sheets

BUFFERING CONTROL FOR ACCOMMODATING VARIABLE DATA EXCHANGE RATES

CROSS REFERENCE TO RELATED APPLICATION

This application is a continuation-in-part of application Ser. No. 07/444,090, filed Nov. 30, 1989, now abandoned.

BACKGROUND OF THE INVENTION

1. Cross-Reference to Other Related Application

This patent application is a continuation-in-part of commonly assigned copending U.S. patent application Ser. No. 07/444,090, filed Nov. 30, 1989 for BUFFERING CONTROL FOR ACCOMMODATING VARIABLE DATA EXCHANGE RATES by Irene F. Stein and Steven L. Webb.

2. Field of the Invention

The present invention relates to devices and methods for handling digital data interchanges between assemblies which have differing data exchange rates. More particularly, the present invention relates to processes and apparatus which permit production of digital information from a source at a rate which does not match the rate of information demand from a system intended to ultimately receive the data produced by that source. While not necessarily so limited, the present invention is especially useful for allowing a scanner which converts an image into a stream of digital data to successfully communicate with a receiving device that requests data from the scanner at a rate which does not match the rate data is produced by the scanner.

3. Description of the Prior Art

In an ideal system, digital data for transfer to a receiving device is produced at the same rate that the receiving device can accept it. Such a system does not need any buffering of data. However, many system configurations are such that the digital data is produced from a source at a rate quite different from the ideal data reception rate of the receiver. Data transfer to a remote processor often entails accumulation of the data so that a large block of that data is communicated to the remote processor on command. While the remote processor might have the capability of accepting the entire block of data at a rate much greater than it is produced at the source, the enablement of data transfer communication by the remote receiver occurs only sporadically and asynchronously with respect to data origination at the source.

The problem is particularly apparent in systems employing a document scanner as the data source and a remote data processor as the ultimate receiver. Buffers having enough capacity to store data corresponding to the entire image could permit uninterrupted image scanning followed by transfer of the entire buffer contents to the host. This entails undesirably large buffers especially where each scanned pixel is represented by a byte or more of scaling information.

For instance, a typical color pixel might require three bytes of eight bits each for a total of twenty-four bits to represent a single pixel. Further, the data transfer is delayed until the scan is complete before the host receives any data.

It is possible under some circumstances that the remote processor can accept data at a far greater rate than the scanner can produce it, but, in other situations, the scanner produces data faster that the host can request and/or accept it. Rather than to waste the capabilities of the processor while the scanner is producing its data, the processor releases its interface with the scanner and only periodically enables data transfer or inquires as to whether data is ready for transfer. Therefore buffer memories are often used to accumulate data for subsequent transfer to the remote processor on demand.

Smaller, more practical buffers require some form of synchronization or coordination of the data production from the scanner with the receiving host. It is desirable to produce the data transfers periodically while releasing the host in the interim for handling other functions. Unfortunately, if the data for whatever reason is not requested before the buffer is full, it is necessary to stop the data generation from the scanner to avoid the risk of lost data.

U.S. Pat. No. 4,752,891 by Van Dael et al shows a system for buffered handling of data transfers between a scanner and requesting host where the original image translates to data in a quantity greater than the size of the buffer. A microprocessor receives data about the image size which it divides into a number of segments each equal to or less than the buffer size. The system then scans the first segment until the buffer is full. At that point, scanning is stopped and the scanner mechanism is returned to its original scan start position while the buffer data is transferred to the host. Thereafter, the scanning is restarted with data loading of the buffer enabled whenever the initial boundary of the next image segment is reached. This procedure is repeated until the number of image segments as originally computed is scanned in sequence. Thus, the Van Daele device is restricted to sequences of discrete image scans each equal to the buffer size with mandatory repositioning of the scanner mechanism to its original start position between each segment scan. This allows use of a smaller buffer. However, it aggravates the lost time associated with the prior art wherein a complete image is loaded into a large buffer followed by data transfer to the host while the scanner is repositioned. Furthermore, the maximum data Van Daele et al can acquire in any given scan is limited to the buffer size.

It is also suggested in the prior art to employ separate buffer stores wherein one buffer is loaded from a source. Its contents are then transferred to another buffer which independently interfaces with another data processing device of one kind or another. An example is shown in U.S. Pat. No. 4,511,928 by Colomb. The Colomb device involves the greater expense of separate buffers with their own interfaces and controls. It is incapable of concurrent loading and emptying of a common buffer.

U.S. Pat. No. 4,367,493 by Matteson describes a system for allowing data exchanges between a scanning device and an output device with disparate data handling rates by use of a buffer. In FIG. 3 of Matteson, an up/down counter keeps track of the data loaded and unloaded from the buffers. That counter drives control circuitry which responds to a preset maximum count (T2) in the up/down counter to commence reducing or dropping of power to the drive motor. However, an encoder and its associated sensor continue their data gating function even as the motor slows to a stop. Removal of adequate counts from the up/down counter as a result of data transfers to an output device continues until a preset minimum count T1 is reached to reactivate the drive motor power circuit. The motor accelerates so that the encoder immediately commences production of gating pulses at an increasing rate until the motor reaches full speed. Accordingly, all of the potential scan line losses as well as the distortion resulting from slowing and stopping of a drive motor and accelerating it at a later time, is experienced by devices constructed in accordance with the teachings of the Matteson patent.

Another arrangement to accommodate the differing data interfacing rates in a somewhat similar manner to Matteson is shown in U.S. Pat. No. 4,748,514 by Bell wherein the speed of the scanner motor is slowed and stopped as the data buffer approaches and reaches capacity. However it is highly undesirable to significantly vary the speed of the scanning bar of a scanner because of the distortion introduced to the data thus collected.

Other prior art systems have attempted to resolve the problem by utilizing dual data memories so that the remote processor receives data from one memory while the scanner is loading data into the other memory. This does not prevent loss of data when the remote unit is delayed for a period long enough for the scanner to fill both buffer memories.

None of the known prior art data buffering configurations realize minimal data buffer size while obtaining maximum data transfer as is obtained by the present invention. Further, these advantages exist for this invention despite significant disparities between data production as by a scanner and data reception as by a receive command generating data processor. Prior buffering systems do not realize the advantages of concurrent data transfers into and out of a common memory. Both results are advantageously obtained by the present invention.

DISCLOSURE OF THE INVENTION

In order to keep the scanning mechanism moving independently of the host transfer rate, the present invention uses a buffer to accept the scanned data and to deliver it to the host as it is requested by the host. The whole scanning window is scanned in anticipation that the host will ask for all the data, though it may do so in portions at a time. The buffer is filled at the same time it is emptied by the host avoiding a start/stop of the scanning mechanism after just a buffers worth of data is scanned. The buffer loading and emptying can occur concurrently in common recycling or "wrap-around" sequences relative to the buffer storage positions. Furthermore, the concurrency of buffer loading and emptying makes it possible under some circumstances to scan an entire image without stopping or delaying data transfer to a host despite the presence of an image size many times larger than the buffer capacity.

If the buffer does fill before the entire window is scanned, the scanning bar is stopped and relocated at a position from which it will resume scanning when emptying of the buffer is at least initiated by the host. In one embodiment of this invention, the scanning is restarted after a full buffer condition is detected but, at least one data storage position is emptied by data transfer to the host receiver.

By anticipating the host requests, the scanned information is available at the rate the host can accept it. Allowing the host to empty the buffer at the same time it is filled by scanned data avoids stopping and restarting the scanning mechanism if the host is fast enough.

In another embodiment, the scanner is initiated or restarted whenever the host processor has requested an amount of data greater than the scanned data contents of the buffer memory. Thereafter, the concurrency of memory loading and data transfer to the host continues as described above. The data transfer request received from the host processor contains a byte count in conjunction with the request. The master processor uses that byte count to compare against the number of bytes actually stored in the memory to determine whether to initially start or to restart the scanner mechanism. Thus, the scanner control is based upon request size versus memory content.

The present invention makes it possible to scan more than the buffer size. With a fast host, repositioning of the scanner mechanism may not occur at all even though the image size is many times larger than the buffer. Further, scanning once initiated can continue past the amount the host requests in anticipation that the host will eventually request it.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENT

Figure 1:
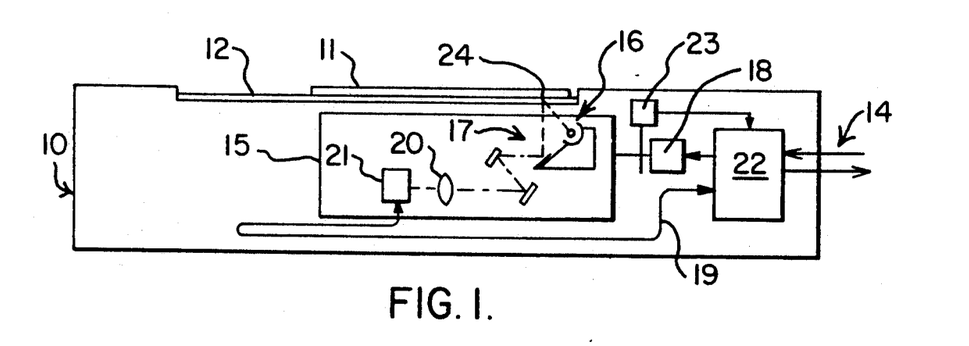
FIG. 1 is a partially schematic side view of the environment of a scanner device in which this invention is useful.
Figure 2:
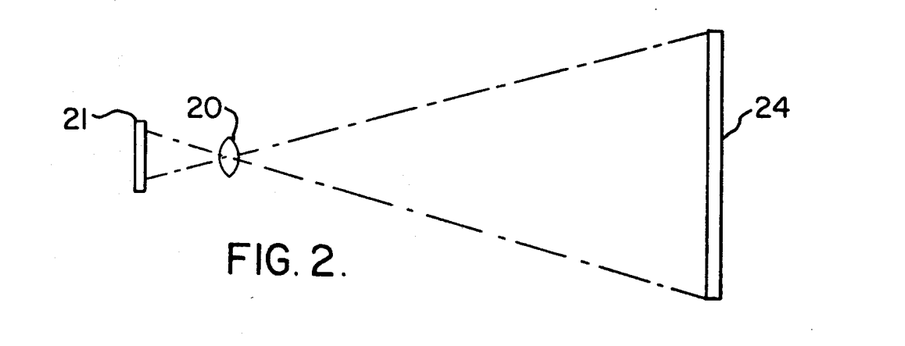
FIG. 2 is a linearized presentation of the optical path of the FIG. 1 scanner.
Figure 3:
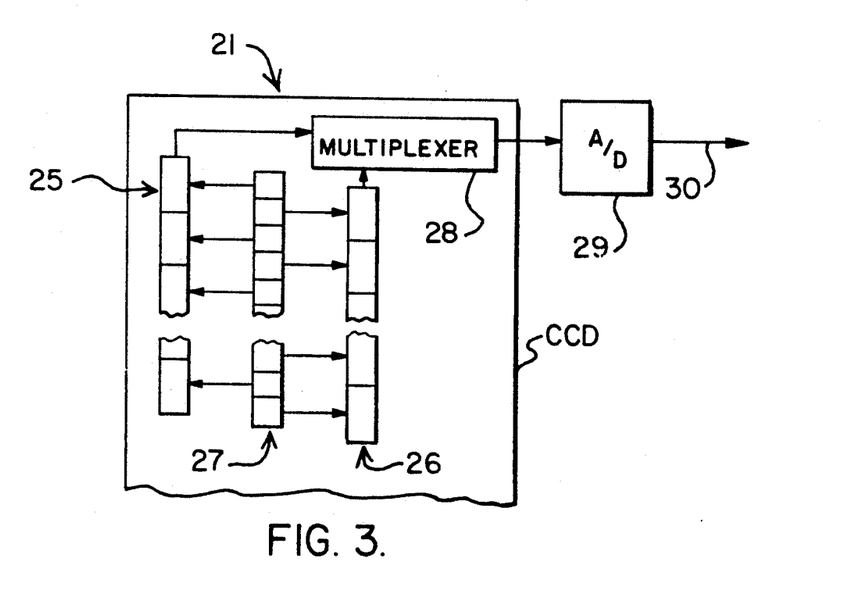
FIG. 3 is a partially broken schematic view of the circuitry for handling and digitizing sensed analog data received from a scanner.

A typical document scanning machine environment for implementing the present invention is shown in FIGS. 1-3 in the form of scanner 10. While this scanner is of the general type in which the present invention finds utility, the invention is not limited to this machine.

In this exemplary scanner, document 11 is positioned with one side facing downwards on transparent platen 12. The downward facing side of document 11 is then scanned so as to convert the visual images contained thereon into an electronic image form that is useable by data processing machines and the like.

The scanning is accomplished in a FIG. 1 type device by movable carriage 15 which contains a linear light source 16 and an array 17 of reflecting mirrors. Motor 18 is mechanically coupled to carriage 15 as by gears, cables or the like, to move carriage 15 along the length of platen 12. The light reflected from platen 12 is redirected into lens 20 and thence into sensor 21.

Note that alternative scanning arrangements are available. For instance, lamp 16 could remain fixed with its light directed onto scan line 24 by yet another mirror on carriage 15. Further, a similar scanning result is possible by maintaining lamp 16 as well as mirror array 17 fixed while propelling document 11 past a fixed scanning location corresponding to line 24. Dual mirror carriages with one carriage moving at half the speed of the other to direct reflected light into a stationary sensor 21 is still another prospective alternative configuration.

Sensor 21 is preferably a charge coupled device (CCD) assembly configured as a linear serial array of discrete detector cells. Each detector cell of sensor array 21 defines a document picture element (PEL) or pixel. CCD's which can distinguish a variety of cell densities (e.g.: 300 cells per inch) on the document are readily available from contemporary commercial sources and can provide good quality resolution.

In FIG. 2, the typical image scan line 24 (note FIG. 1) is optically reduced in length as it passes through lens 20 in a predetermined ratio (e.g.: 7.5:1) before reaching the CCD detector array 21. The analog electrical signal content of sensor 21 is periodically read out, document line by document line, as carriage 15 moves along the length of document 11 on platen 12.

The output scan signals from sensor array 21 are coupled through flexible cable 19 to electronic controller 22 after conversion to digital form as described below in conjunction with FIG. 3. Controller 22 introduces drive signals to motor 18 and can function in an open loop manner with no feedback. However, it may also receive position or movement feedback information relative to carriage 15 such as from the output of a tachometer detector arrangement 23. Controller 22 incorporates the data processing and handling elements for exchanging data and signals with a remote processor in communication with the output cable 14 in accordance with the present invention. The operation of controller unit 22 is described in greater detail below in conjunction with FIGS. 4 et seq.

FIG. 3 illustrates one arrangement for reading out the contents of sensor 21. By means of gating signal controls (not shown) typically from controller 22, the analog signal content of every other detector cell of photocell array 27 is coupled in parallel into analog shift register 25 while the signals present in the other, intervening cells are coupled in parallel into analog shift register 26. That is, in the example shown, the contents of the odd numbered cells of array 27 are periodically transferred to shift register 25 whereas the even numbered cells have their contents transferred to shift register 26 at the same time.

The signals loaded into registers 25 and 26 are analog signals representative of various reflected light levels from individual pixels of document 11 into photocell array 27. Their electrical analog magnitude corresponds to the average of the light reflected from a small incremental area or pixel on the surface of document 11 over a predetermined period of time. Subsequent to transfer into registers 25 and 26, these signals are shifted serially through multiplexer 28 into an analog to digital converter (A/D) 29. A variety of appropriate analog to digital converters are commercially available for this purpose.

The output 30 of A/D 29 is a sequence of bytes of data, for example, one byte of data for each document 11 pixel or PEL. Each of those bytes is encoded so as to correspond digitally to the magnitude of a discrete one of the analog signals retrieved from shift registers 25 and 26, and thus each byte corresponds to the magnitude of reflected light present at one of the cells of array 27. That is, if array 27 images 300 cells or pixels per inch, output 30 of A/D 29 comprises a similar 300 bytes per inch.

Figure 4:
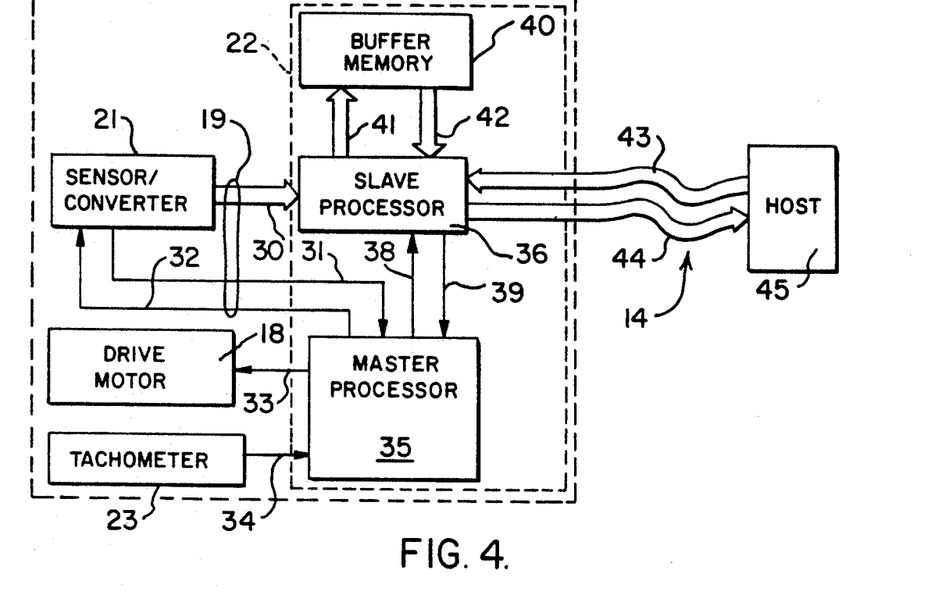
FIG. 4 is a block diagram of the circuit elements associated with the present invention.

The organization of the major electrical and electronic elements associated with the preferred embodiment of this invention is set forth in block diagram form in FIG. 4. The master central processing unit (CPU) 35 controls movement of the carriage 15 (note FIG. 1) by appropriate activation signals on connection 33 for motor 18 either as an open-loop or in conjunction with carriage positioning feedback from tachometer 23 detected on connection 34. In addition, master CPU 35 turns on and off the CCD sampling and analog to digital conversion of sensor/converter 21 via control signal dialog over lines 31 and 32.

The digital data result of unit 21 operation is presented in parallel on multiple line cable 30 to slave processor 36 which inserts the bytes of data into a storage location in buffer memory 40 over cable 41. Slave processor 36 receives and stores data in response to initiating commands from master CPU 35 via connection 38 and continuously informs CPU 35 of its status and operations over line 39.

Slave processor 36 is also in communication with a host data handling unit 45 via communication links 43 and 44. While parallel bit multiple line cables could provide the interface between host 45 and slave processor 36, a variety of data transmission disciplines are available for this purpose including modems, fiber optic communications, etc.

Figures 5, 6:
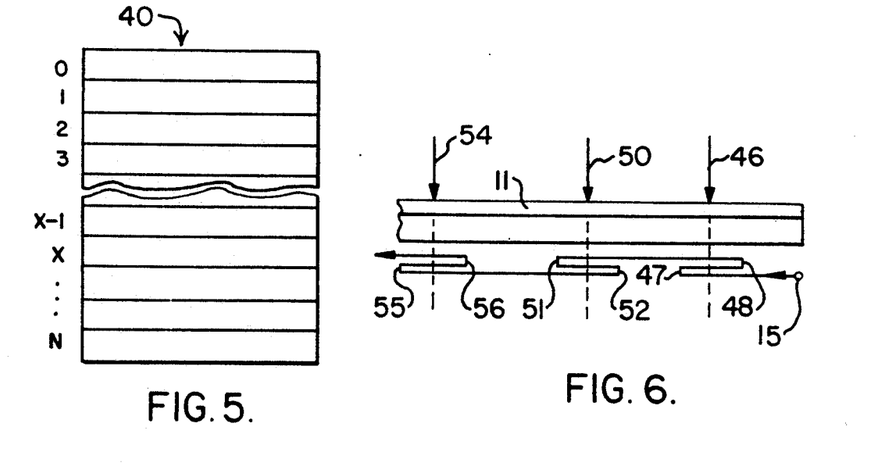
FIG. 5 is an illustration of a buffer memory organization.
FIG. 6 is a representation of the scan head movement relative to a document as determined in conjunction with the present invention.

Buffer memory 40 is represented in FIG. 5 as a table with a sequence of data storage locations 0 through N. As a byte, block, group or line of data is received from sensor/converter unit 21 over cable 30, it is inserted in the next available location starting with location 0. As host 45 notifies slave processor 36 that it is ready to receive data, processor 36 begins transmitting blocks of data to host 45 over link 44 starting with the data contained in buffer memory 40 location 0. Loading of location N completes filling of memory 40 at which point processor 36 immediately begins to recycle memory 40 by again loading data into location 0 as long as it is then available. Processor 36 can concurrently handle entry of data blocks into memory 40 from sensor unit 21 and transmission of data blocks from memory 40 to host 45. As long as host 45 requests data from processor 36 as fast as, or faster than, data is inserted into memory 40, the system proceeds smoothly until data corresponding to the entire document 11 is scanned by the scanning mechanism. This is in contrast to the prior art and is accomplished despite a size of memory 40 that is a fraction of the quantity of data needed to represent the entire scanned image. The transmission of data to host 45 begins with the content of location 0 and proceeds sequentially to location N so that memory 40 is loaded and unloaded on a wrap-around or recycling first in, first out basis. Typically processor 36 is loading data in a downstream location of memory 40 such as at location "X" at the same time data is extracted from a prior memory location (e.g.: 0, 1, 2, 3, etc.) for transfer to the host 45 interface.

Processor 36 notifies CPU 35 whenever host 45 fails to request data from storage before the last available memory 40 location is loaded. By way of example, this might occur if processor 36 has loaded location N but host 45 has failed to request data contained in location 0. Or host 45 may have received data from location 0 through location X, but processor 36 has loaded through location N and wrapped around so that it has reloaded locations 0 through X−1. At this time, CPU 35 notes the location of the scanning head relative to the document and stops the drive motor. It further reverses the drive motor to return the carriage to a point ahead of the noted stop location where it remains until host 45 begins recovering data from memory 40 locations.

The movement of the scanning mechanism 15 relative to the platen 12 and document 11 under consideration in accordance with the foregoing is depicted in FIG. 6. Processor 35 actuates the drive motor so that carriage 15 is at a predetermined velocity as it reaches the leading edge of document 11. For this example, assume that memory 40 is full when carriage 15 reaches line 46 of its scanning of document 11. CPU 35 causes the drive motor to stop so that carriage 15 halts as it reaches position 47 beyond 46. CPU 35 reverses the drive motor so that carriage 15 returns to position 48 where it remains until CPU 35 determines that processor 36 can now load more data into memory 40. The distance from 48 to 46 is such that carriage 15 is again at full velocity as it reaches position 46 to start producing more scan data. This minimizes data distortion in the scanning process.

The foregoing stop/start sequence repeats each time memory 40 is loaded and awaiting a data request from host 45. Two more such sequences are illustrated in FIG. 6 at 50-52 and 54-56. Eventually the complete quantity of data to define document 11 is loaded into memory 40 and transferred over interface 14 to remote host 45.

Figure 7:
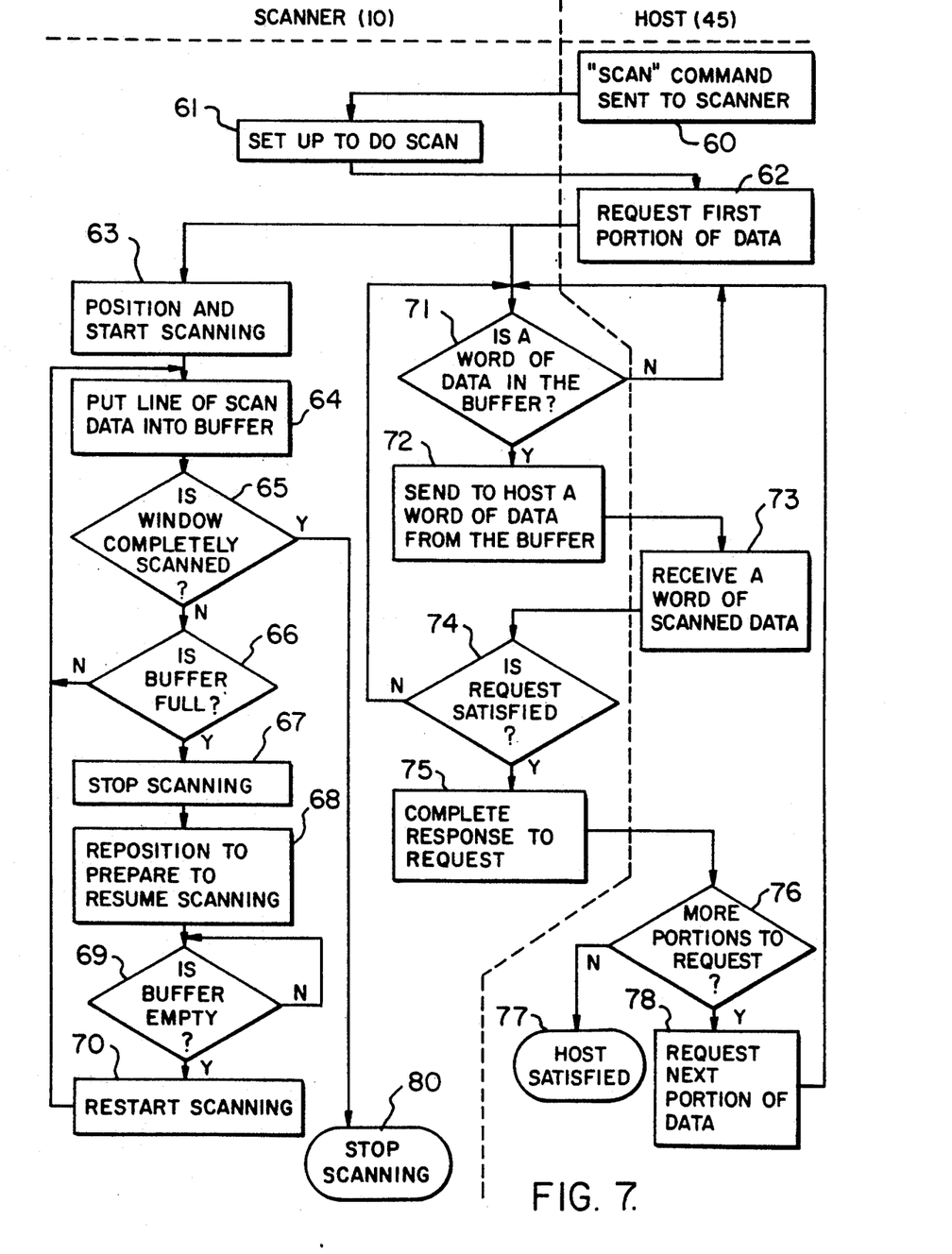
FIG. 7 is a flow chart of the system operation in accordance with one embodiment of the present invention.

FIG. 7 is a flow chart presenting the sequence of decisions and actions associated with the operation of the elements described herein in conjunction with the first preferred embodiment. That is, FIG. 7 is a flow chart of a scan as it relates to buffer control. The right side of the vertical dotted line in FIG. 7 contains the flowchart elements associated with the host 45 which demands to receive data a portion at a time. The left side shows the scanner 10 which is doing two operations simultaneously: filling buffer 40 with scanned data and emptying buffer 40 as it fulfills the host requests.

As described, the logical functions 64–70 following the initial scan start 63 and logical functions 71, 72, 74 and 75 are all controlled by the slave processor 36 in coordination with master processor 35. However, it is readily apparent that either processor 35 or 36 can perform any or all of the FIG. 7 operations alone or in coordination with the other, but independent of the processor for host 45 in any event. Otherwise FIG. 7 is relatively straightforward and readily understood by those having normal skill in the art.

Figure 8:
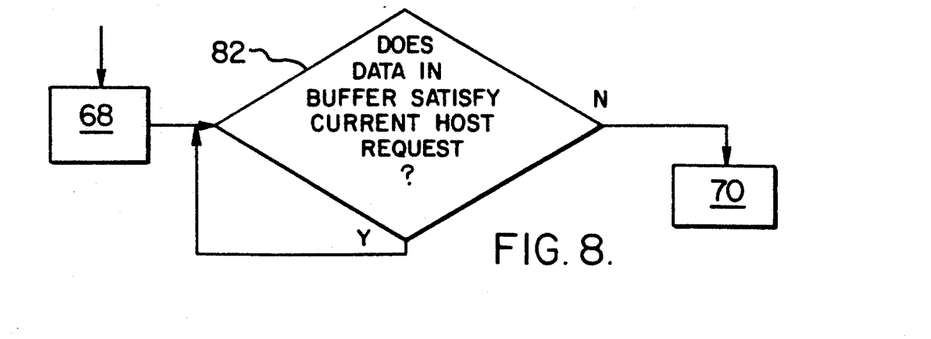
FIG. 8 is a modification of the FIG. 7 flowchart in accordance with a second embodiment of this invention.

FIG. 8 illustrates a modification to the FIG. 7 flow-chart to implement the process of a second embodiment of this invention. Here the decision block 69 of FIG. 7 is replaced by decision block 82. The functions otherwise presented in FIG. 7 apply to FIG. 8. This includes function block 68 relating to repositioning of the scanning mechanism preparatory to resumption of scanning and function block 70 which initiates the scanning restart.

In a typical exchange with the processor of a host 45 in FIG. 4, the host 45 frequently is arranged to generate a receive command containing both a request for scan data and identification of the quantity of data host 45 is willing to receive in response to that command. FIG. 8 depicts the response of one of the processors associated with scanner 10. As long as buffer 40 contains the same or a greater number of bytes as requested by host 45, scanning restart 70 is not selected. Conversely, even if buffer 40 is not empty, but the number of bytes it contains is less than the request from host 45, a scanning restart is initiated. Accordingly, this scan restart is initiated concurrently with the commencement of data transfer of whatever data was present in buffer 40 to the host 45. This further minimizes lost time and could even result in loading of buffer 40 while concurrently transferring scan data to the host on a continuing basis without further interruption of the scanning. In fact, as presented in FIG. 8 in conjunction with FIG. 7, the scanning would continue until either buffer 40 is again full or the image window scanning is completed.

Figure 9A:
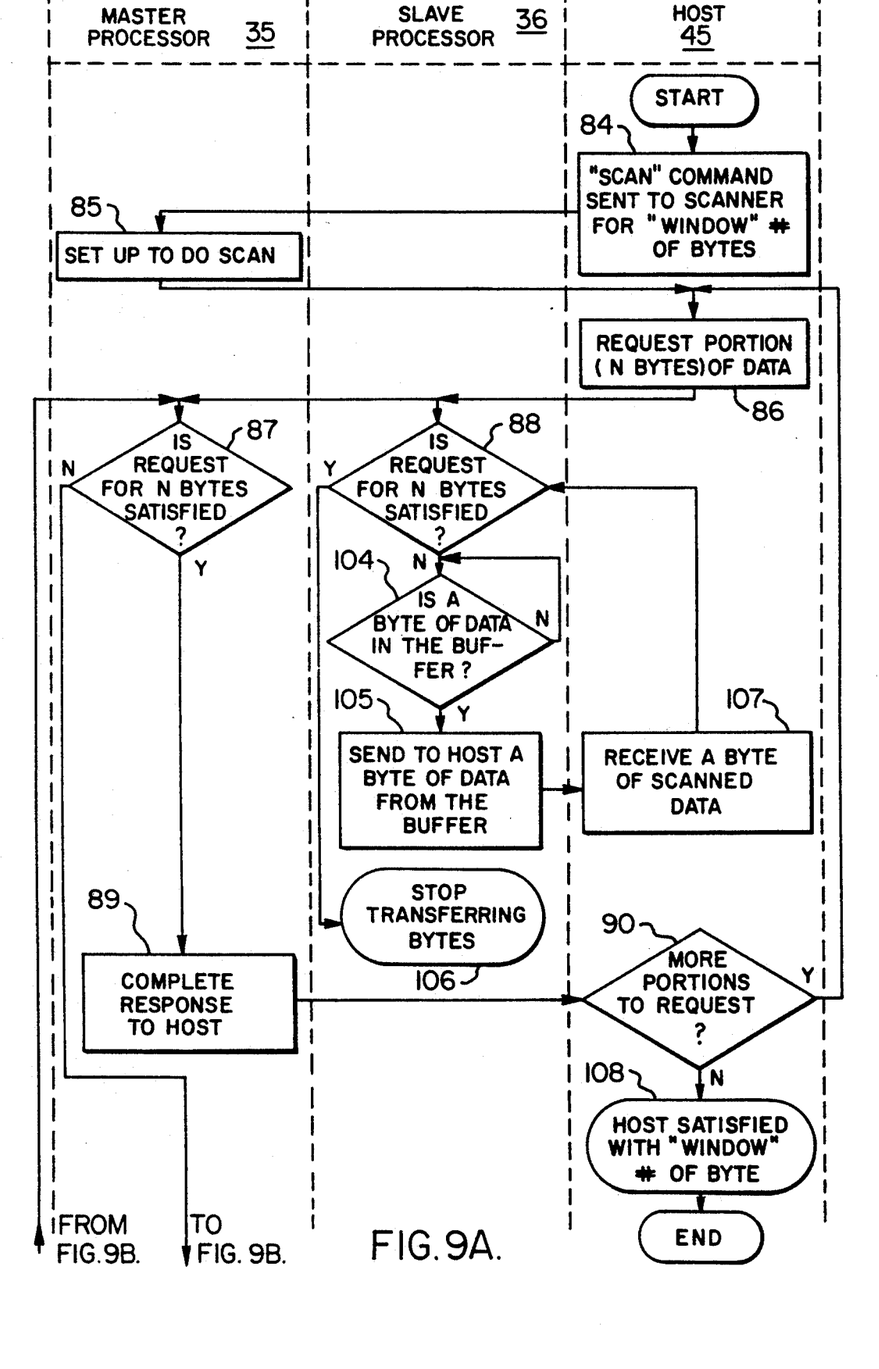
FIGS. 9A and 9B taken together are a composite flowchart of a version of the second embodiment of this invention.
Figure 9B:
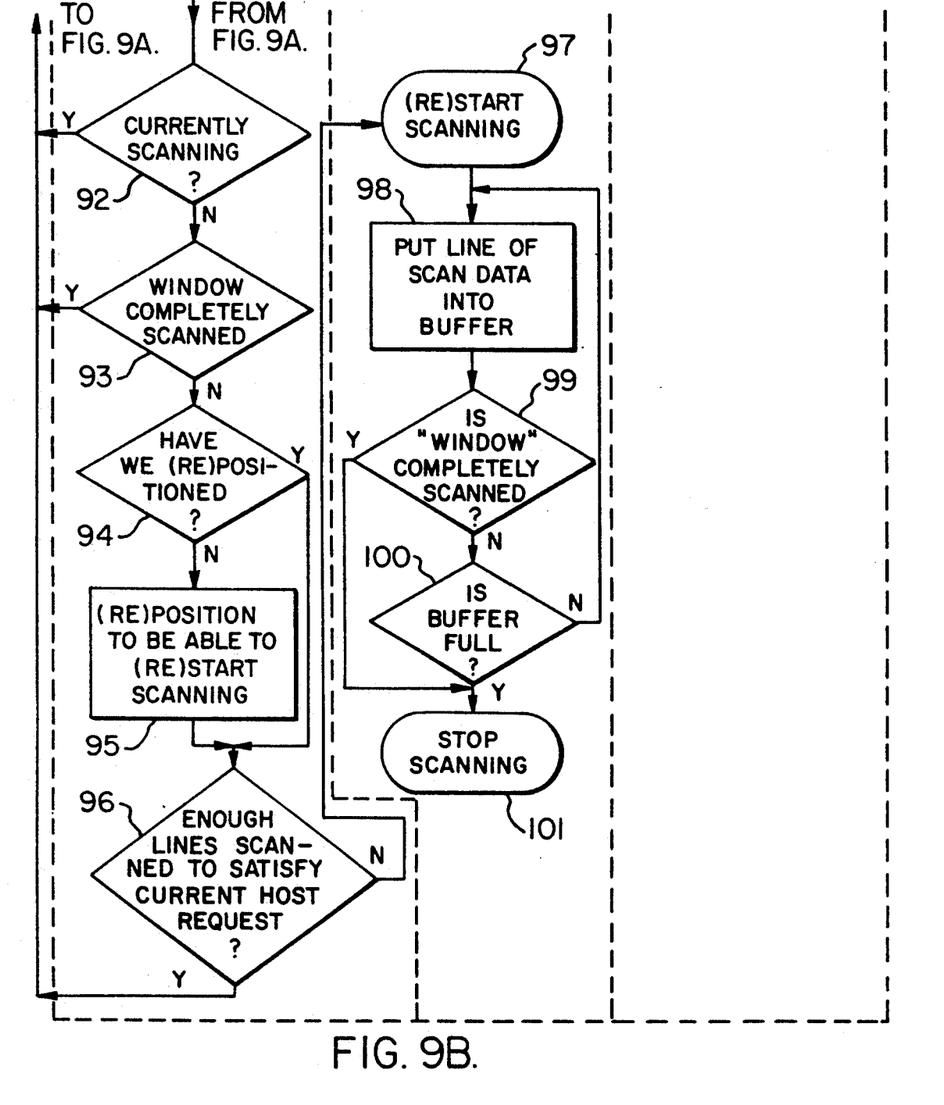

FIGS. 9A and 9B placed in descending order presents a flowchart amplifying on the operation of this invention in accordance with the second embodiment. This chart sets forth a typical division of functions between processors 35 and 36 of FIG. 4 along with their interfacing relationships between one another as well as with host 45. Host 45 initiates the process at 84 by transmitting a scan command to master processor 35 including identification of the numbers of bytes corresponding to the total "window" of that request. Processor 35 performs the set up procedure 85 readying the scanner.

Upon receipt of a ready signal, host 45 proceeds to generate a request 86 for N bytes which is here assumed to represent a portion of the total number of bytes needed to digitally define the total image of the scan window. Both processors 35 and 36 determine at 87 and 88, respectively, whether the block of N bytes were transferred to host 45. If so, processor 35 signals at 89 that the response is complete. Host 45 then decides at 90 whether or not it is appropriate to request the next N byte block. Processor 35 senses whether scanning has stopped at 92 and if the scan window was completed at 93 before it positions (or repositions) the scanner either preparatory for a start of a new scan or a restart of an ongoing scan.

Decision 96 is next reached to decide whether enough lines were scanned and stored in memory 40 to satisfy the current request from host 45. If so, the processor returns to recycle at the input to decision block 87. Lack of enough stored data to meet the host request causes master processor 35 to direct a command to slave processor 36 to start or restart scanning 97.

Note that processor 36 thereupon commences placing scan data into buffer 40 and does not stop the scanning until either the window is completely scanned or buffer 40 is full. Slave processor 36 also controls the actual transferring of data bytes to host 45 pursuant to decision blocks 88 and 104 along with action blocks 105 and 106. The reception of data bytes at 107 and the recycling of N byte block requests pursuant to decision 90 in host 45 continues until the last portion or block of N bytes to satisfy the window is detected at 108.

Note that the scanner is always started with the initial request 86 from host 45. This initiates the loading of lines of scan data bytes into memory 40 in a recycling manner as described previously herein. The scanner operation causes placement of lines of scan data bytes into buffer 40, while bytes are concurrently sent to host 45 from buffer 40. There are many instances where the scanner may scan and put lines into buffer 40 with many more such lines than would ordinarily fit into buffer 40, but never reach a buffer full condition. The need to reposition and restart the scanner is avoided under those circumstances because host 45 is receiving bytes from buffer 40 fast enough to always leave room for more scan lines.

It is only the case where the host 45 does not receive bytes fast enough and there is more scan data than fits in buffer 40 that scanning stops and the scanner is repositioned ready for restart. In the FIGS. 8 and 9 embodiment, this restart is only done when it is determined that the current request for bytes from the host is specifying more bytes than are currently in buffer 40. Note that, as shown in the FIG. 9 flowchart, the count is kept as scanned lines rather than bytes as scanning of enough lines is required to service the amount of bytes in the host request 86. In most cases this means more bytes (but less than a full line of bytes) are scanned than are transferred for this request. The surplus bytes are used to start satisfying the next request 86.

Master processor 35 operates in a loop to monitor the scanning taking place by the slave processor 36. Processor 35 also keeps count of the number of lines scanned. Once slave processor 36 stops the scanning because it is done with the window or because buffer 40 is full, master processor 35 then determines whether to reposition the scanner and then when to subsequently start the scanning again. A determination that there is an equal number of bytes in buffer 40 for the numbers of request 86, restart does not occur since this could represent the end of the desired scan data.

In the example shown herein, slave processor 36 controls memory 40 while master processor 35 makes the decision to initiate a restart of scan. When allowed, slave processor 36 puts lines of scan data into buffer 40 and also outputs bytes of data to host 45 in a concurrent manner. Buffer 40 itself is treated by slave processor 36 in a recycling, wrap-around fashion. Master processor 35 keeps track of how many lines slave processor 36 has scanned because processor 35 is interrupted by slave 36 for each line. Master processor 35 stores the total number of scanned lines needed to handle the current request from host 45 including the sum of all previous requests for the scan window involved. Processor 35 controls slave processor 36 and does much of the work in restarting scans.

The manner host 45 requests a particular byte count is through receive commands which contains that byte count. Host 45 requests data for a scan in blocks rather than all at once. Usually, the block size corresponds to a buffer size employed by the host at its remote location. Blocks are requested until all data for the scan is transferred.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for coordinating digital data set exchanges from a source of sequences of digital data sets to a digital data receiver wherein the source produces the data sets at a relatively constant rate while the receiver requests such data sets at a rate which is asynchronous with respect to the rate data sets are produced by the source and wherein the source is capable of responding to receipt of recycle commands by ceasing production of digital data sets and subsequently reinitiating digital data production at the point in the data sequence at which data production was interrupted comprising:

memory means having a plurality of data storage sections arrayed in sequence from an initial said storage section to a final said storage section, means for placing data sets from the source into said data storage sections in said data storage section sequence and including means responsive to placement of a data set in said final storage section by recycling said sequential data set storage in said memory means by placing the next data set in said initial data set storage section provided the data set previously stored in said initial data storage section was transferred to the data receiver, means responsive to a request for data sets from the receiver for transferring data sets from said memory means storage sections to the receiver in said storage sequence, and means detecting that no said data storage sections are available to receive a data set from said source for introducing the recycle command to the data source to prevent the data source from introducing the next data set to said memory means, said detecting means further including means sensing that at least one said storage section has become available from transfer of a data set to the receiver for causing the data set source to commence producing the data sets at the constant data rate starting with said next data set.

2. Apparatus in accordance with claim 1 which further includes communication link means coupling said receiver and said data set request responsive means.

3. Apparatus in accordance with claim 1 wherein said data set placing means and said data set request responsive means are concurrently operable.

4. Apparatus for coordinating digital data exchanges between an image scanner which produces a sequence of digital data representing a scanned image at a constant data rate and a host data receiver capable of requesting data at a rate different from the rate data is produced by the scanner, and wherein the scanner includes means responsive to input signals thereto for locating and moving a scanning device relative to the image scanned, said apparatus comprising:

memory means having a plurality of data storage sections arrayed in sequence from an initial said storage section to a final said storage section, data storage control means including means for placing data from the scanner into said data storage sections in said data storage sequence and in a recycling sequence when said final data storage section is full, means responsive to signals from the host data receiver for transferring data from said memory means storage sections to the host receiver with said data transfer occurring in said data storage sequence, and means responsive to the state of said memory means including means detecting that said memory means is full for introducing a stop input signal to the scanner to cease producing digital data and position the scanning device preparatory to scan the next digital data producing image position, said memory means state responsive means further including sensing means operable after introduction of said stop input signal to the scanner for determining that data in at least one of said memory storage sections was transferred to the host receiver for introducing an input signal to the scanner to cause it to resume production of digital data commencing with the point of cessation in the data production sequence.

5. Apparatus in accordance with claim 4 wherein said data storage control means and said host signal responsive means are concurrently operable.

6. Apparatus in accordance with claim 4 wherein said sensing means causes the scanning device to move at the speed which produces scanned image data at said constant rate before scanning the next image position following the last image data placed in said memory.

7. The method of utilizing a memory which includes a plurality of sequential data storage locations for transforming data from a source of sequential data sets to a host device which produces signals requesting transmissions thereto of data from the source comprising the steps of loading data from the source into the memory in the same sequence as the memory data storage locations and recycling the data loading to the initial location if it is available after loading the last location, transferring data sets from the memory to the host device concurrently with said loading step and in response to a request signal therefrom with the data set transfer occurring in the same recycling sequence as said loading step, detecting that all memory locations are full, responding to said detecting step by causing the source to cease producing data sets, and restarting the data set source when the data sets contained in the memory are less than the number of data sets requested by the host device.

8. The method in accordance with claim 7 wherein each said data set the source produces is a line of bytes of data, said data loading step including the step of sequentially placing said lines into the memory, and said transferring steps includes the step of sequentially transferring the said bytes of each said line from the memory to the host device.

9. Apparatus for transferring digital data produced by an image scanner to a host device which generates signals for requesting blocks of image correlated data produced by the scanner where the requests occur asynchronously relative to the scanner produced data comprising memory means having a plurality of data storage sections arranged in sequence from an initial said storage section to a final said storage section, first means responsive to each host device request signal for initiating transfer in said sequence of any data contained in said memory to the host device, second means responsive to each host device image requesting signal for producing a scan signal if the data contained in said memory is less than the amount of data in the block associated with the request signal, means enabled by said scan signal for actuating the image scanner to commence producing image defining data, means loading said image scanner produced data into said memory locations in a recycling manner in said sequence from said initial location to said final location, means transferring data from said memory means to the host device in a recycling manner in said sequence from said initial location to said final location, and means for stopping the scanner operation when the host device requires no further data as well as when said buffer has no further available locations for storing data from the scanner, whereby data is concurrently loaded into said memory and transferred from said memory with minimum interruptions of operation of the scanner.

10. Apparatus in accordance with claim 9 which includes means responsive to said scanner operation stopping means for causing the scanner to cease data production and to position the scanner with the minimum separation from the last scanned line of the image to the scanner mechanism so that the scanner will reach full scanning speed as it encounters the next scan line from said last scanned line on receipt of said scan signal.

11. Apparatus in accordance with claim 9 wherein the data produced by the scanner is a plurality of lines of bytes corresponding to pixels making up a line of the image under scan, said loading means including means placing said image scanner produced data into said memory locations a line at a time, and said data transferring means including means sequentially retrieving said bytes of each said line for communication to the host device.

* * * * *